United States Patent
Chartrand

(10) Patent No.: US 7,039,174 B1
(45) Date of Patent: May 2, 2006

(54) SYSTEM AND METHOD FOR ROUTING CALLS TO MULTI-FUNCTION TELEPHONE NUMBERS

(76) Inventor: Victor Chartrand, 313 E. Broadway #1063, Glendale, CA (US) 91209-1063

( * ) Notice: Subject to any disclaimer, the term of this patent is extended or adjusted under 35 U.S.C. 154(b) by 0 days.

(21) Appl. No.: 10/716,048

(22) Filed: Nov. 17, 2003

Related U.S. Application Data

(63) Continuation-in-part of application No. 09/751,870, filed on Dec. 29, 2000.

(60) Provisional application No. 60/174,429, filed on Jan. 4, 2000.

(51) Int. Cl.
*H04M 7/00* (2006.01)

(52) U.S. Cl. .......................... 379/221.14; 379/100.09; 379/211.01; 379/211.02; 379/221.01

(58) Field of Classification Search ........... 379/100.09, 379/211.01, 211.02, 221.01, 221.14
See application file for complete search history.

(56) References Cited

U.S. PATENT DOCUMENTS

| | | | | |
|---|---|---|---|---|
| 5,018,191 A | * | 5/1991 | Catron et al. | 379/100.09 |
| 5,408,528 A | * | 4/1995 | Carlson et al. | 379/211.02 |
| 5,467,390 A | * | 11/1995 | Brankley et al. | 379/229 |
| 5,768,356 A | * | 6/1998 | McKendry et al. | 379/242 |

* cited by examiner

*Primary Examiner*—Ahmad F. Matar
*Assistant Examiner*—Quynh H. Nguyen
(74) *Attorney, Agent, or Firm*—Robert M. Hunter

(57) ABSTRACT

A system and method of routing telephone calls to specific communications devices allows multiple communications devices to use a common telephone number. One telephone number may therefore be used to place calls to different communications devices in potentially different locations. Using such a system and method, the proliferation of telephone numbers and area codes can be sufficiently controlled, as the addition of cellular telephones, facsimile machines and pagers has created the need for increases in area codes and digits that must be dialed. The present system and method allows a caller to reach a desired communication device by first dialing a set of prefix characteristics representing a specific communications device followed by a telephone number to which that specific communications device is assigned.

37 Claims, 3 Drawing Sheets

SYSTEM AND METHOD FOR ROUTING CALLS TO MULTI-FUNCTION TELEPHONE NUMBERS

CROSS-REFERENCE TO RELATED APPLICATION

This application is a continuation-in-part of U.S. patent application Ser. No. 09/751,870, filed Dec. 29, 2000, now pending, which claims the benefit of U.S. Provisional Application No. 60/174,429, filed Jan. 4, 2000, whose entire contents are hereby incorporated by reference in their entirety.

BACKGROUND OF THE INVENTION

1. Field of the Invention

The invention relates generally to telecommunications systems. Specifically, the invention relates to the use of a set of prefix characteristics and a multi-function telephone number to direct a call to communications devices assigned to that telephone number.

2. General Background and State of the Art

Existing telephone systems have become inundated with cellular telephones, pagers, facsimile machines, and other communications devices which have strained the availability of telephone numbers. To ease the strain, three digit area codes have been added based upon geographic location to increase availability. This has proved to be only a temporary solution, and has resulted in some cities having many different area codes, increasing the numbers that must be dialed when placing a call.

One prior art technique attempts to bypass or replace a recipient company's switchboard operator (or other means of directing incoming calls) with a preprogrammed code attached to the telephone number. For example, one prior art technique disclosed in U.S. Pat. No. 6,076,121 allows callers to dial preprogrammed codes and a telephone number to reach a desired recipient or communications device. Each five-digit destination code (prefix) (see Table 5, col. 13, lines 50–67 and col. 14, lines 50–63 of the reference) would route the call directly to a specific group such as Accounts Payable, Sales, Engineering Director, Laundry Room, etc. Over 1,000 destination codes would be needed to reach the many groups in various organizations. Hence, the reference, at col. 12, lines 45–46, contains the statement "Therefore, there is no inherent limit on the quantity of FP codes which can be defined in the future." Each telephone number is assigned at least one functional property code, that when dialed along with the telephone number, directs the call to a destination. This allows one telephone number to be used multiple times for many different communications devices. The recipient of a call, however, is responsible for assigning a functional property code to all of their telephone numbers; callers must then remember hundreds of functional property codes for each telephone number they wish to dial, which can vary widely not only for the telephone numbers of each recipient, but also from recipient to recipient. This technique, therefore, lacks a uniform standard that would make it easy for callers to remember a particular code, and creates the possibility of a caller having to dial a large, multi-digit functional property code before every telephone number. Code dialing could be done indirectly by a device that displays the available groups and allows the caller to select a target grout such as "Sales."

Another prior art technique disclosed in U.S. Pat. No. 5,465,295, allows a caller to dial a telephone number for a recipient followed by a coded suffix. This technique is used where a recipient has multiple telephones or communications devices, each having a different telephone number. The coded suffix directs the call to another one of the recipient's telephone numbers without having to remember the actual number for the particular telephone or communications device. Therefore, the caller does not need to remember or record every telephone number of a recipient; instead, the caller needs to dial only one number, followed by the appropriate coded suffix. This technique, however, does not solve the problem of limited availability of usable telephone numbers, since all communications devices of a recipient would be independently reachable by a separate telephone number.

The present invention addresses these problems with a simple, easy to use set of prefix characterstics that can be widely and uniformly applicable and that ease the strain created by the proliferation of communications devices and area codes. When combined with a telephone number, the set of prefix characteristics directs calls to communications devices, where multiple communications devices are assigned to common telephone numbers.

Accordingly, it is an object of the invention to provide a system and method of routing calls to communications devices using multi-function telephone numbers, where a potentially large number of communications devices are assigned to a common telephone number.

Accordingly, it is an object of the invention to provide a system and method of routing calls to communications devices using multi-function telephone numbers, where a potentially large number of communications devices are assigned to a common telephone number.

It is also, in object of the invention to reduce the number of telephone numbers by allocating one number to many different communications devices.

It is a further object of this invention to provide a way to reduce the number of area codes needed.

INVENTION SUMMARY

The invention provides a system and method of routing calls to communications devices using multifunction telephone numbers. The invention routes calls to specific communications devices assigned to a common telephone number by dialing a set of prefix characteristics followed by a telephone number. A central network identifies a call as being intended for a specific communications device based upon the set of prefix characteristics and routes the call to that device, provided that the specific communications d-vice intended has been assigned to the telephone number.

The invention solves the problem of the proliferation of area codes and telephone numbers by allowing telephone numbers to be used for more than one communications device. A person having a voice line, a fax line, a cellular phone, a modem, a pager, or any other device requiring a telephone number may use one common telephone number for all of these devices. A caller wishing to contact this person on a specific one of his or her communications devices would dial the common telephone number, preceded by a short code designed to indicate to which of the communications devices the call is intended. Using this framework, a caller would only need to dial an area code when calling a different geographical location.

The present invention provides that any combination of prefix characteristics may be used to indicate a specific communications device. In one embodiment, a default-number may be set as a number not requiring a set of prefix characteristics, and such a number car be directed to any communications device. For example, a regular voice line phone may be set as a default line and would use the art currently existing. Additional line phones would then each be assigned a set of prefix characteristics. In another embodiment, a facsimile line may be dialed by first entering a set of prefix characteristics indicating a facsimile, for example the pound key (#). Another code may represent a wireless phone, for example the star key (*). Thus, on its most basic level, the present invention provides that the same 7-digit telephone number is the same telephone number for many different devices, but is actually at least an 8-digit telephone number. The following table illustrates an example of sets of prefix characteristics that can be used in the present invention:

|  | Local Calls | Long Distance Calls |
| --- | --- | --- |
| Line | 234-5678 | 1-xxx-234-5678 |
| Facsimile | #-234-5678 | 1-xxx-#-234-5678 |
| Wireless | *-234-5678 | 1-xxx-*-234-5678 |
| Second Wireless | 2*-234-5678 | 1-xxx-2*-234-5678 |
| Third Wireless | 3*-234-5678 | 1-xxx-3*-234-5678 |

The present invention therefore greatly reduces the array of 7-digit telephone numbers with which consumers-must contend. For example, a family of four with six separate phone numbers (1 line, 1 fax, and 4 wireless) would have their array of numbers reduced to virtually one number. The same consolidation of telephone numbers would also be highly beneficial to businesses. For example, members of a group of limousine drivers, company vice presidents or real estate agents, etc. could each have the same 7-digit line number as part of their 9-digit telephone number. In various groups, number recall is essentially reduced to one digit as shown below. In the following table, note also that for long distance calls, the local call numbers are preceded by the appropriate area code (1-XXX) as in the above table. The area code may also follow the *.

| Phone Type | Local Calls | Group 1 | Group 2 |
| --- | --- | --- | --- |
| Line | 234-5678 | Residence | Real Estate Office |
| Wireless | *-234-5678 | Husband | Owner |
| 2nd Wireless | 2*-234-5678 | Wife | Agent 1 |
| 3rd Wireless | 3*-234-5678 | Son | Agent 2 |
| 4th Wireless | 4*-234-5678 | Daughter | Agent 3 |

Additionally, the invention provides that different sets of prefix characteristics may be used, depending upon a variety of factors, such as market preference and infrastructure criteria for implementation. Using the above table, it is clear that a large number of additional lines and devices are able to be included for every telephone number, limited only by the number of available combinations of digits on a telephone keypad. The reduction in telephone numbers would also have the societal benefit of correcting other major problems. In addition to each telephone subscriber being potentially accessible by a multitude of communications devices through only one telephone number plus a set of prefix characteristics, much larger areas would be served by each area code, with the result that local calls would require only 7 digits and not 11 digits. Also, the availability of 8-digit cellular numbers will be greatly expanded by the inclusion of all existing 7-digit numbers. Additionally, number recall, dialing accuracy, number acquisition and accounting records would all reach greater levels of productive efficiency.

Each U.S. area code includes 792 assignable three-digit prefixes which produces 7.92 mill on phone numbers. These numbers presently serve line, fax, and wireless phones. By going to eight digits on fax and wireless, the present invention separates these groups so each has its own full complement of numbers. With each area code now dedicated to roughly 7.9 million line phone numbers, 75% of U.S. area codes can be eliminated and seven-digit line dialing maintained. In the case of wireless, the two-digit prefix (2* through 9*) would provide another 63 million wireless numbers per area code, etc. This is highly significant in view of the run-away growth of wireless phones ir the U.S. from 11 million (1992) to 86 million (1999). However, the invention makes it feasible for wireless phones to have two or more input lines, such as office and home numbers.

In a preferred embodiment, the invention is a method of processing a call, the method comprising: informing the customers of the telecommunications system that one of a plurality of unique sets of symbol headings is normally, but not always, associated with one type of communications device that is connectable to a telecommunications system (e.g., in advertising and/or in a service contract); assigning one of a plurality of unique multi-digit e.g., common 7-digit) telephone numbers to each selected customer (e.g., subscriber) of the telecommunications system within each area code of each local area and granting said each selected customer having a specific communications device that is connected to the telecommunications system the exclusive right to optionally use a combination comprising any one of said unique sets of symbol headings plus said unique multi-digit telephone number to identify the specific communications device other than a land voice line to the other customers of the telecommunications system; receiving a sequence of signals representing a specific set of symbol headings plus a specific unique (e.g., within an area code) multi-digit (e.g., common or multi-functional) telephone number that has been dialed by a caller, the combination of the specific set of prefix characteristics plus said specific multi-digit telephone number and no other common 7-digit telephone number alone identifying the specific communications device that is the destination for said call; and connecting said call to the specific communications device that is the destination for said call without necessarily determining the type of communications device to which the call is directed. For example, in dialing a combination that includes a particular set of symbol headings, the particular set of symbol headings dialed does not alone indicate to the downstream equipment that the customer desires to send a fax message, i.e., communicate with a fax machine. Preferably, the specific set of symbol headings is the # symbol and the # symbol plus said specific multi-digit telephone number identifies a specific fax machine or a specific second voice line with or without an associated facsimile machine. Preferably, the specific set of symbol headings is the * symbol and * symbol plus said specific multi-digit telephone number identifies a first specific cellular telephone. Preferably, the specific set of symbol headings is a digit plus the * symbol and the * symbol plus said specific multi-digit telephone number identifies another specific cellular telephone.

In preferred embodiments of the invention, the following results necessarily follow from practicing the invention: (1) providing about 7.92 million assignable combinations for landline voice communication devices within each area code, about 7.92 million assignable combinations for facsimile or second landline voice communications devices within each area code, and about 71.28 million assignable combinations for cellular telephone communications devices within each area code, which equals a grand total of about 87.12 million assignable combinations available within each area code; (2) at least increasing by a factor of 11 the number of assignable combinations within each area code when compared to the number of assignable numbers available within an area code of a conventional telecommunications system; thereby allowing at least the number of area codes to be reduced from 302 to 54 when compared to a said conventional telecommunications system; (3) substantially eliminating the overlay practice of providing two area codes in a specific local area and requiring customers to dial three extra digits or ten digits to reach a specific communications device within said specific local area; (4) providing three separate and distinct numbering complements consisting of a first complement of common 7-digit telephone numbers for landline voice communications devices, a second complement of 8-digit combinations containing a # symbol for facsimile communications devices and a third complement of 8-digit or 9-digit combinations containing a * symbol for cellular communications devices, thereby eliminating the extensive processing required by said conventional telecommunications system to determine whether a common 7-digit telephone number is being used by a landline voice communications device, a facsimile communications device or a cellular communications device; and (5) eliminating the practice of splitting a region of said conventional telecommunications system previously served by an existing single area code into two halves whenever the existing area code reaches its maximum capacity of 7.92 million subscribers, and adding a new area code in one of the halves of the region, forcing one half or 3.96 million subscribers to accept a new 10-digit telephone number containing said new area code, at a great level of inconvenience, stress and cost of changing telephone numbers with the addition of each new area code.

In another preferred embodiment, the invention is a method of directing a call to a specific communications device, comprising: announcing to (e.g., informing in some way) the customers of a telecommunications system that one of a plurality of unique symbols is normally (e.g., but not in a mandatory way) associated with a particular type of communications device that is connectable to a telecommunications system; assigning one of a plurality of unique (e.g., within each area code) common 7-digit telephone numbers to each selected customer of the telecommunications system and granting said each selected customer having a specific communications device the exclusive right to optionally use a combination comprising any one of said unique symbols plus said unique (e.g., multi-function or common) 7-digit telephone number to identify the specific communications device (e.g., landline telephone, facsimile machine, cellular telephone, etc.) to other customers of the telecommunications system (and/or to other customers of other telecommunications systems); and receiving a call having been initiated by a caller by dialing a combination comprising a specific unique symbol and a specific telephone number; determining the destination indicated by the combination, no other common 7-digit telephone number alone indicating said destination; and routing the call to the specific communications device represented by the combination. Preferably, the specific unique symbol is the pound key and the pound key plus said specific telephone number identifies a specific facsimile machine or a specific second voice line with or without an associated facsimile machine. Preferably, the specific unique symbol is the star key and star key plus said specific common 7-digit telephone number identifies a first specific cellular telephone. Preferably, the specific unique symbol is a digit plus the star key and star key plus said specific common 7-digit telephone number identifies another specific cellular telephone. Preferably, the method further comprises directing the call to a cellular processing network if the specific unique symbol and the specific common 7-digit telephone number indicates that the call is being made to a specific cellular telephone.

In yet another preferred embodiment, the invention is a system for processing a call made to a (e.g., multi-function or common) telephone number and directed to a specific communications device to which that telephone number is assigned (e.g., linked in the minds of customers), the system comprising: means for announcing to the customers of a telecommunications system that one of a plurality of suggested sets of symbol headings is normally associated with a single type of communications device that is connectable to a telecommunications system; means for assigning one of a plurality of common telephone numbers to each selected customer of the telecommunications system and granting said each selected customer having a specific communications device the exclusive right to optionally use a combination comprising any one of said suggested sets of symbol headings plus said common telephone number (e.g., linked to the selected customer in the minds of other customers) to identify the specific communications device to other customers of the telecommunications system; a sequence of signals representing a specific set of symbol headings and a specific common telephone number that have been dialed by a caller, the sequence of signals being the sole directory number for the specific communications device (which directory number may or may not be listed), the set of symbol headings immediately preceding the common telephone number, being distinguishable from said common telephone number and together with said common telephone number defining a destination for said call; and a routing apparatus having a switching component and an identification component for determining the intended destination of the call and connecting the call to that destination.

In another preferred embodiment, the invention is a routing system for directing calls to different communications devices having identical telephone numbers, said system comprising: an administrative subsystem comprising means for informing the customers of a telecommunications system that one of a plurality of suggested symbols is normally (but not always) associated with each type of communications device that is connectable to a telecommunications system and means for assigning one of a plurality of unique telephone numbers (e.g., within an area code) to each selected customer of the telecommunications system and granting said each selected customer having a specific communications device the exclusive right to optionally use a combination comprising any one of said plurality of suggested symbols plus said unique telephone number to identify the specific communications device (e.g., of any available type) to other customers of the telecommunications system; a network subsystem having routing apparatus including a switching component and an identification component for processing a call to a destination, the call including a sequence of signals indicating a set of symbol headings and a telephone number that have been dialed by a caller, the destination being identified by the set of symbol headings, the sequence of signals being a directory number for the specific communications device; and at least one communications device assigned to a telephone number; wherein said the set of symbol headings does not necessarily indicate to said routing apparatus that the specific communications device is a particular type of communications device. For example in a preferred embodiment of the invention an 8-digit facsimile number and an 8-digit cellular telephone number of each selected customer would each contain the common 7-digit landline number of the selected customer.

In a further preferred embodiment, in a telecommunications system in which at least some subscribers control a plurality of communications devices, a system for routing a telephone call to a specific communications device of a particular subscriber, the invention is a system comprising: means for accepting a combination comprising a heading and a common telephone number (e.g., one linked in the mind of callers and/or in a directory with a particular subscriber) as an indication that a caller desires to reach the specific communications device of the particular subscriber (e.g., a line telephone, a cellular telephone, a facsimile machine, or a pager), said specific communications device of the particular subscriber being reachable by the caller's dialing no other telephone number (e.g., each specific communications device is associated with only one directory number); and means for routing said telephone call to the specific communications device of the particular subscriber. For example, in a preferred embodiment, using a # symbol as a code does not indicate to the means for routing that the caller desires to send a fax message. This is conventionally done by the calling tone, a one-second burst of 1100 Hertz occurring every three seconds, that is produced by the caller's fax machine. Preferably, the means for accepting is selected from the group consisting of: a line telephone, a cellular or wireless telephone, a facsimile machine, and a pager. Preferably, said heading is selected from the group consisting of: a prefix that precedes an area code, a prefix that follows an area code, a suffix that precedes an area code, and a suffix that follows an area code. Preferably, said heading is the # symbol and the # symbol plus said common telephone number identifies a specific fax machine or a specific second voice line with or without an associated facsimile machine. Preferably, said heading is the * symbol and * symbol plus said common telephone number identifies a first specific cellular telephone. Preferably, said heading is a digit plus the * symbol and the digit plus the * symbol plus said common telephone number identifies another specific cellular telephone. Preferably, said heading is a digit plus the # symbol and the digit plus the # symbol plus said common telephone number identifies another specific voice land line with or without an associated facsimile machine.

In a telecommunications system, a preferred embodiment of the invention is a system for routing a telephone call to a specific communications device of a particular subscriber, said system comprising: means for assigning a common telephone number to the particular subscriber; means for accepting the common telephone number alone as an indication that a caller desires to reach the specific communications device of the particular subscriber, said specific communications device of the particular subscriber being a first voice landline telephone; means for accepting a combination comprising a symbol and the common telephone number as an indication that the caller desires to reach another specific communications device of the particular subscriber, said specific communications device of the particular subscriber being reachable by the caller's dialing no other common 7-digit telephone number; and means for routing said telephone call to the specific communications device of the particular subscriber. For example, in a preferred embodiment of the invention, an 8-digit facsimile number and an 8-digit cellular telephone number of the particular customer would each contain the common 7-digit landline number of the particular customer.

In another preferred embodiment implemented in a telecommunications system, the invention is a routing system for routing a telephone call to a specific communications device of a particular subscriber within an area code, said routing system comprising: means for assigning a common 7-digit telephone number to the particular subscriber; means for accepting the common 7-digit telephone number alone as an indication that a caller desires to reach the specific communications device of the particular subscriber, said specific communications device of the particular subscriber being a first voice landline device; means for accepting an 8-part or 9-part telephone number comprising a heading and the common 7-digit telephone number as an indication that the caller desires to reach another specific communications device of the particular subscriber, said other specific communications device of the particular subscriber being reachable by the caller's dialing no other common 7-digit telephone number; and means for routing said telephone call to the specific communications device of the particular subscriber. Preferably, said caller has the option of using as the heading a # for a facsmile device or a second voice device, a * for a first cellular device, or a 2*, a 3*, a 4*, a 5*, a 6*, a 7*, a 8*, or a 9* for another cellular device. Preferably, in this embodiment, 7.92 million voice landline devices or other devices, 7.92 million facsimile devices or other devices, and 71.28 million cellular devices or other devices are reachable with the area code, for a total of 87.12 million communications devices of any type being reachable within the area code.

In another preferred embodiment implemented in a telecommunications system, the invention is a method for routing a telephone call to a specific communications device of one of a plurality of subscribers within an area code, said method for routing comprising: assigning a common 7-digit telephone number to the one of a plurality of subscribers; accepting the common 7-digit telephone number alone as an indication that a caller desires to reach the specific communications device of the one of a plurality of subscribers, said specific communications device being a first voice landline device; accepting an 8-part or 9-part telephone number comprising a heading and the common 7-digit telephone number as an indication that the caller desires to reach another specific communications device of the one of a plurality of subscribers, said other specific communications device being reachable by the caller's dialing no other common 7-digit telephone number; and routing said telephone call to the specific communications device of the one of the plurality of subscribers. Preferably, said caller has the option of using as the heading a # for a facsimile device or a second landline voice device, a * for a first cellular device, or a 2*, a 3*, a 4*, a 5*, a 6*, a 7*, a 8*, or a 9* for another cellular device. In this embodiment, 7.92 million voice landline devices or other devices, 7.92 million facsimile devices or other devices, and 71.28 million cellular devices or other devices are reachable with the area code, for a total of 87.12 million communications devices of any type being reachable within the area code. With preferred embodiments, the availability of telephone numbers for subscribers within each area code increases from 7.92 million telephone numbers in the background art, to 87.12 million telephone numbers with the present invention, where the increase of 79.2 million telephone numbers is derived from the addition of 10 new headings (e.g., #, *, and 2* through 9*) to the present block of 7.92 million telephone numbers, to produce said increase of 10×7.92 or 79.2 million new telephone numbers.

In yet another preferred embodiment in a telecommunications system having 199.1 million residential subscribers, the invention is a method for routing a telephone call to a specific communications device of one of said residential subscribers, said method for routing comprising: assigning a common 7-digit telephone number to the residential subscriber; accepting the common 7-digit telephone number alone as an indication that a caller desires to reach a first voice landline communications device of the residential subscriber or accepting an 8-part or 9-part telephone number comprising a heading and the common 7-digit common telephone number as an indication that the caller desires to reach a cellular telephone communications device of the residential subscriber, said cellular telephone communications device being reachable by the caller's dialing no other common 7-digit telephone number; and routing said telephone call to the appropriate communications device of the residential subscriber. Preferably, in this embodiment, the residential subscriber can choose any one of the residential subscriber's 7-digit, 8-digit or 9-digit telephone numbers to be his basic one-number system because they are all exclusively assigned to him; all of telephone numbers that include the residential subscriber's 7-digit telephone number are assigned exclusively as a set to the residential subscriber; said set of telephone numbers is permanently (exclusively) assigned to the residential subscriber as long as one of them is being used; a telephone number that included the residential subscriber's 7-digit telephone number that is not being used is held in a standby mode and cannot be disconnected and assigned to any other subscriber because it is exclusively assigned to the residential subscriber; and with the invention disclosed herein a portion of the 199.1 million residential telephone subscribers would be assigned telephone numbers for landline telephone service and cellular telephone service that contained the same 7-digit telephone number, thereby releasing that portion of common 7-digit telephone numbers for other subscribers. Thus, for each million subscribers that have, in the background art, two separate 7-digit telephone numbers, consisting of a common 7-digit landline telephone number and a separate 7-digit cellular telephone number, would have, with preferred embodiments of the present invention, one common 7-digit landline telephone number and an 8-digit cellular telephone number that contains a * plus the exact same common 7-digit landline telephone number, thereby releasing one million common 7-digit telephone numbers for use by other subscribers.

DETAILED DESCRIPTION OF THE EMBODIMENTS

Figure 1:
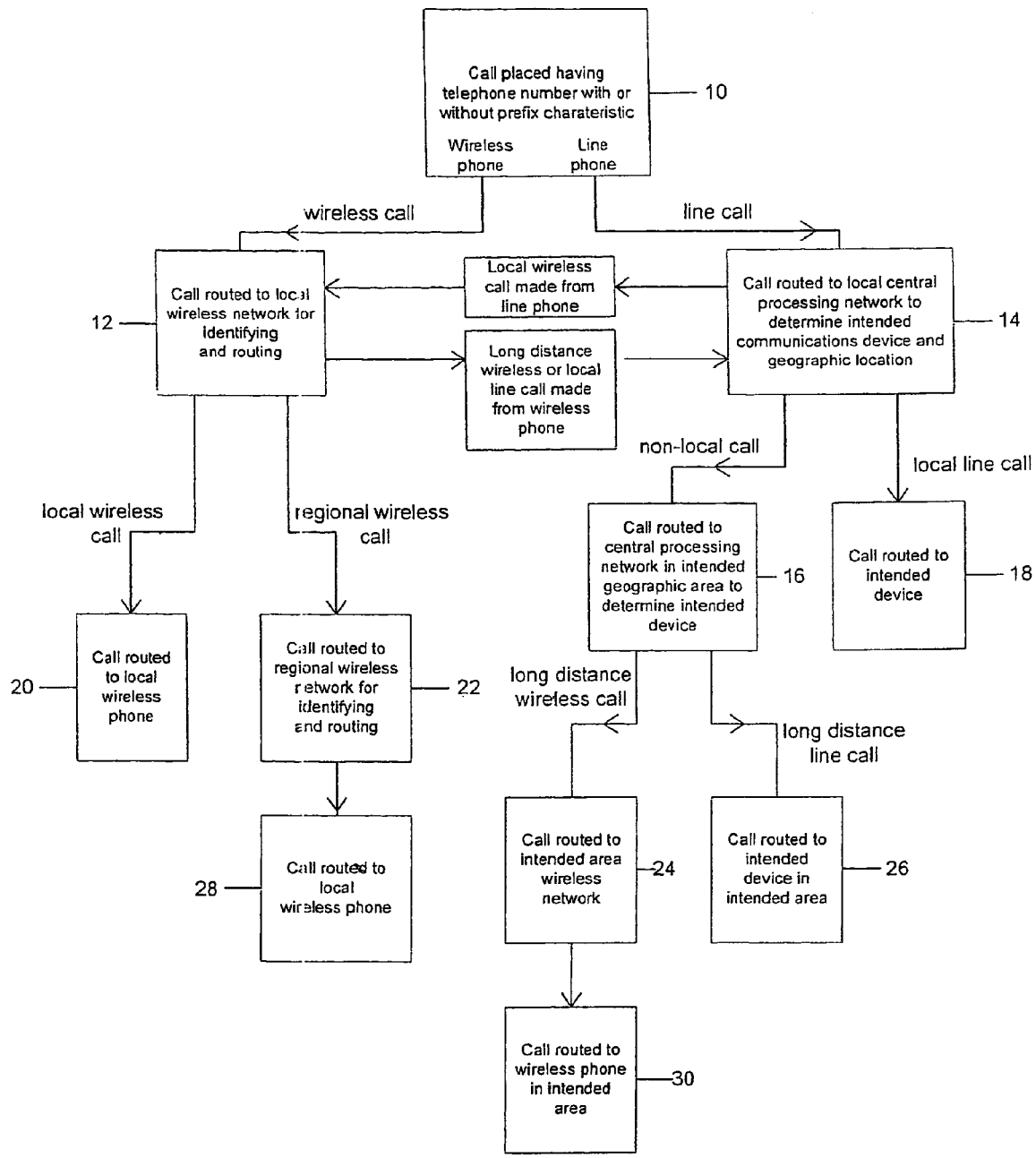
FIG. 1 is a block diagram flowchart of the overall operation of a system implementing the present invention.

FIG. 1 is a block diagram flowchart of the overall operation of a system implementing a preferred embodiment of the present invention. In block 10, a call is placed, such as for example from a wireless or cellular phone, facsimile machine or line phone. In a preferred embodiment of the present invention, the call is placed by dialing a set of prefix characteristics plus a telephone number. The telephone number is preferably preceded (but may be followed) by the set of prefix characteristics that together indicate a destination for each call. Each destination is a specific, intended communications device. A specific communications device may be a cellular or wireless telephone, a line telephone, a facsimile machine, a pager, or any other device now known or developed in the future which may be capable of receiving a call over a public telephone network. This specification intends that the terms wireless and cellular can be used interchangeably to refer to any telephone which communicates by transmitting and receiving signal using radio waves or other wireless forms of communication.

In one embodiment, the initial prefix characteristic is a C (or 2) for cellular or an F (or 3) for facsimile, followed by the telephone number. In another embodiment, a double-digit prefix is entered prior to the telephone number. For example, a caller can dial 1# (or 4#) for Internet, P# (or 7#) for pager, S# (or 7#) for satellite, and W# (or 9#) for wireless. In yet another embodiment, the two-digit prefix can include two non-numeral characters, such as for example ** or #*.

Telephone keypads may also be modified to allow additional symbols to appear on the keypad. Each touch-tone digit is a unique combination of two single-frequency tones. The frequencies are arranged in a matrix. As the button is pushed for a specific digit, the appropriate combination of two tones is generated, corresponding to the intersection of the vertical and horizontal axes. The frequencies corresponding to the horizontal axis are called low band and are 697 Hz, 770 Hz, 852 Hz, and 941 Hz. The frequencies corresponding to the vertical axis are called high band and are 1209 Hz, 1336 Hz, 1477 Hz, and 1633 Hz. When a button is pushed, two tones at the frequencies corresponding to the intersection of the vertical and horizontal axes are produced. A central processing network or mobile switching center senses the frequencies of the tones and determines the dialed digit. For example, if the digit 8 were pushed, two frequencies would be generated simultaneously and filtered and detected to determine the dialed digit.

However, there are four frequencies for the vertical axis and only three columns of digits on stands rd telephone keypads. Therefore, there are four available buttons on every keypad that are not used or provided for. Accordingly, four more symbols may be placed on each keypad. In the present invention, these symbols could be used as prefix characteristics to indicate an intended communications device. For example, Greek letters may be used as buttons on a keypad, such as $\phi$, $\lambda$, $\pi$ or $\psi$. These could therefore be used to create set of prefix characteristics where $\phi$ represents a wireless phone, $\lambda$ represents a facsimile machine, $\pi$ represents a pager, and $\psi$ represents a line phone.

Each keypad digit is also expressed as a so-called BCD (binary coded decimal) four-bit code. The * is equivalent to a binary 1011, which is a decimal eleven (11), and the # is equivalent to a binary 1100, which is a decimal twelve (12). Also available are three unused BCD (binary coded decimal) four-bit codes that represent each digit. These are binary 1010 (ten), 1101 (thirteen), and 1110 (fourteen). Another row of three or more new symbols may be provided on new phones or with an inline attachment on present phones. Each symbol may designate a specific function like fax, wireless, Internet, pager, etc. and may be utilized in the same manner as the * for wireless that was previously described.

Block 12 of FIG. 1 shows the procession of a call made from a wireless phone. If the call placed in block 10 is made using a cellular telephone, the call is routed through a local network for processing. Current wireless networks include a base station, or cell site, and a mobile switching center.

Wireless phone refers to any cellular or portable telephone that transmits on radio waves to a nearby wireless network and then over a standard telephone network to a line telephone or to a cellular tower and back to a nearby cellular or other portable telephone. This includes wireless telephones that transmit and receive on high frequency bands, as well as cellular systems that transmit via community radar sites or a satellite or other means instead of a local cellular tower. The term wireless phone will be used in this specification to refer to any wireless device, including a cellular telephone or other portable telephone. Line phone will be used in this specification to refer to any telephone using standard telephone lines to transmit and receive telephone calls.

The system and method of the present invention is compatible with the existing wireless infrastructure. Each wireless telephone has a 10-digit number called a Mobile Identification Number (MIN). To receive calls, the telephone searches for its MIN on a paging channel, and to transmit calls, the telephone transmits its MIN. The present invention can be integrated into the current wireless system in several ways. For example, the 10-digit MIN can be extended one or more digits. For incoming wireless calls using a one-digit set of prefix characteristics, the present 10-digit MIN can be used, with the mobile switching center ignoring the set of prefix characteristics and completing the call by paging with the present 10-digit MIN. In this example, the operation of the wireless system proceeds as normal. However, for incoming calls with the 2 or more digit set of prefix characteristics, one digit may be added to the MIN, or in the alternative, a two-step paging process may use the 10-digit MIN. This update may be required only on wireless phones that feature multiple customers sharing numbers one digit apart. In another example, for calls routed through the Public Switches Telephone Network (PSTN), the same switching presently used by the PSTN to route the 10-digit wireless telephone number is utilized. In a further example, for the 11-digit version of the single-digit set of prefix characteristics, the routing may be processed by tone signaling, which ir presently used for control and status indications. The unique tone of a key, for example the * key, which is made by combining the frequencies of 941 Hz and 1209 Hz, acts as a call signal denoting a wireless number.

Calls passing through the wireless network that are determined to be long distance, i.e., to an area code outside of the regional location of the caller, are routed to a central processing network in block 14 and then to a central processing network in the geographical area where the destination of call is located, as shown in block 16. Here, a signal processor and central processing unit determine whether the call is intended for a specific wireless phone, or another destination. If the call is intended for a wireless phone, the call is then routed to the wireless network in the same geographical area, the wireless network including the base station and the mobile switching center. This is shown in block 24. At this point, because of the prefix characteristic dialed preceding the telephone number, it has been determined that the intended communications device is a particular wireless telephone. Accordingly, the call is then routed to the appropriate wireless phone. This is shown in block 30. If the call if intended for a line phone, the call is routed to the specific communications device as shown in block 28.

Calls passing through the wireless network that are determined to be intended for other wireless phones proceed through the base station and mobile switching center. Calls that are intended for local wireless phones are routed to the intended wireless phone as shown in block 20. Calls that are intended for out of the region are routed to another wireless network in the appropriate region as shown in block 22 and then routed to the intended wireless phone in block 28.

Calls may be placed from a wireless phone and intended for another wireless phone without the need for a set of prefix characteristics, as long as the intended telephone number has no other communications devices assigned to it, or as long as the intended telephone number has the a wireless phone as a default device.

If the call placed in block 10 is made from a line telephone using customary telephone lines, the call proceeds to the local central processing network as shown in block 14. If the call is intended for a geographic area outside of the local calling area, it is routed to a central processing network in the intended area as shown in block 16. The central processing network is a Public Switched Telephone Network (PSTN) typically used in the telecommunications field for managing telephone call volume. If it is a local call, the ventral processing network performs call identification and routing functions. The central processing network includes a signal processor and a switching matrix to identify and route calls. The signal processor includes a microprocessor that receives a signal containing the call through an input. The signal processor reads the prefix characteristics at the beginning of the call to determine the intended communications device. Software at the signal processor determines the intended destination and outputs the call to a switch processor and then to the switching matrix, which routes the call to the appropriate location. This location may be either a specific communications device or another central processing network. The central processing network then routes the call to the intended communications device as shown in block 18.

Figure 2:
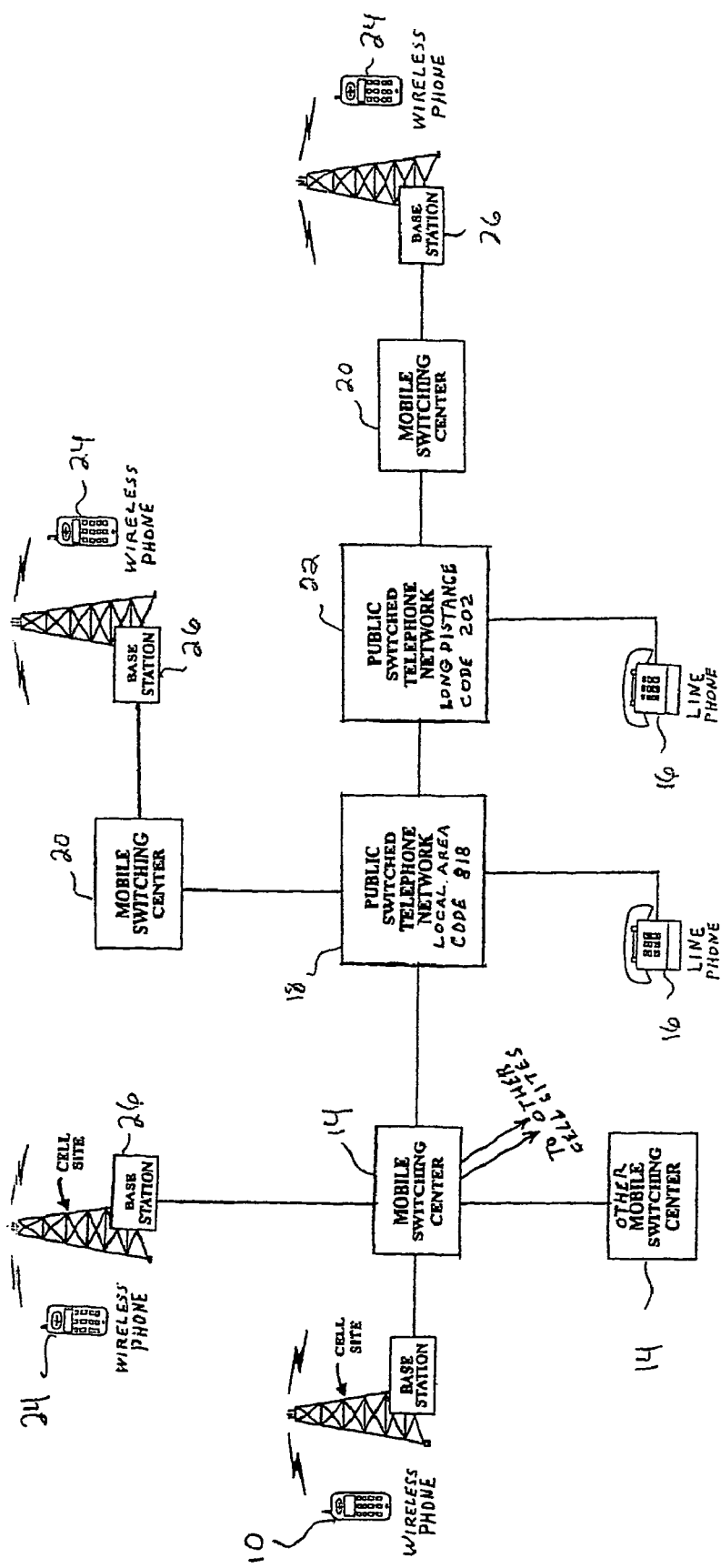
FIG. 2 is an overall schematic view of the system of the present invention, showing the components of a network implementing the present invention.

FIG. 2 is a block diagram of a telecommunications network incorporating the present invention. Telephone calls placed from a wireless phone 10 travel over a wireless connection to a base station 12. The call is transferred to a mobile switching center (MSC) 14. If the call is intended for another wireless phone, it is either directly routed to the intended wireless phone 24, or it is routed to another mobile switching center 14 and their on to the intended wireless phone.

A wireless phone 10 communicates by radio signals directly or via satellite with a base station 12 within its area. The base station 12 converts incoming audio from the MSC 14 into RF (radio frequency) for transmitting to the wireless phone 10 and converts outgoing radio signals from the wireless phone 10 for transfer to the MSC 14 via a land line or microwave link. If the call is intended for another wireless phone 24, the MSC 14 routes the call to the destination wireless phone 24.

If the call is intended for another specific communications device, such as a line telephone 16, or for a wireless phone in a different regional location, the MSC 14 routes the call to a Public Switched Telephone Network (PSTN) 18 in the call area in which the original call is made. The PSTN 18 processes the call and determines whether it is intended for a locally-based device or a device in another geographical location. If intended for a locally-based device, it is either routed to the appropriate device in the case of non-wireless calls, or to an additional mobile switching center (MSC) 20 for processing if the call is intended for a wireless telephone 24. If the call is intended for a device, wireless or otherwise, in another geographic location, the call is routed to an additional PSTN 22. The additional PSTN 22 repeats the previous process, routing the call to a locally-based device, an MSC 20, or another PSTN 22 until the call reaches its intended destination.

Figure 3:
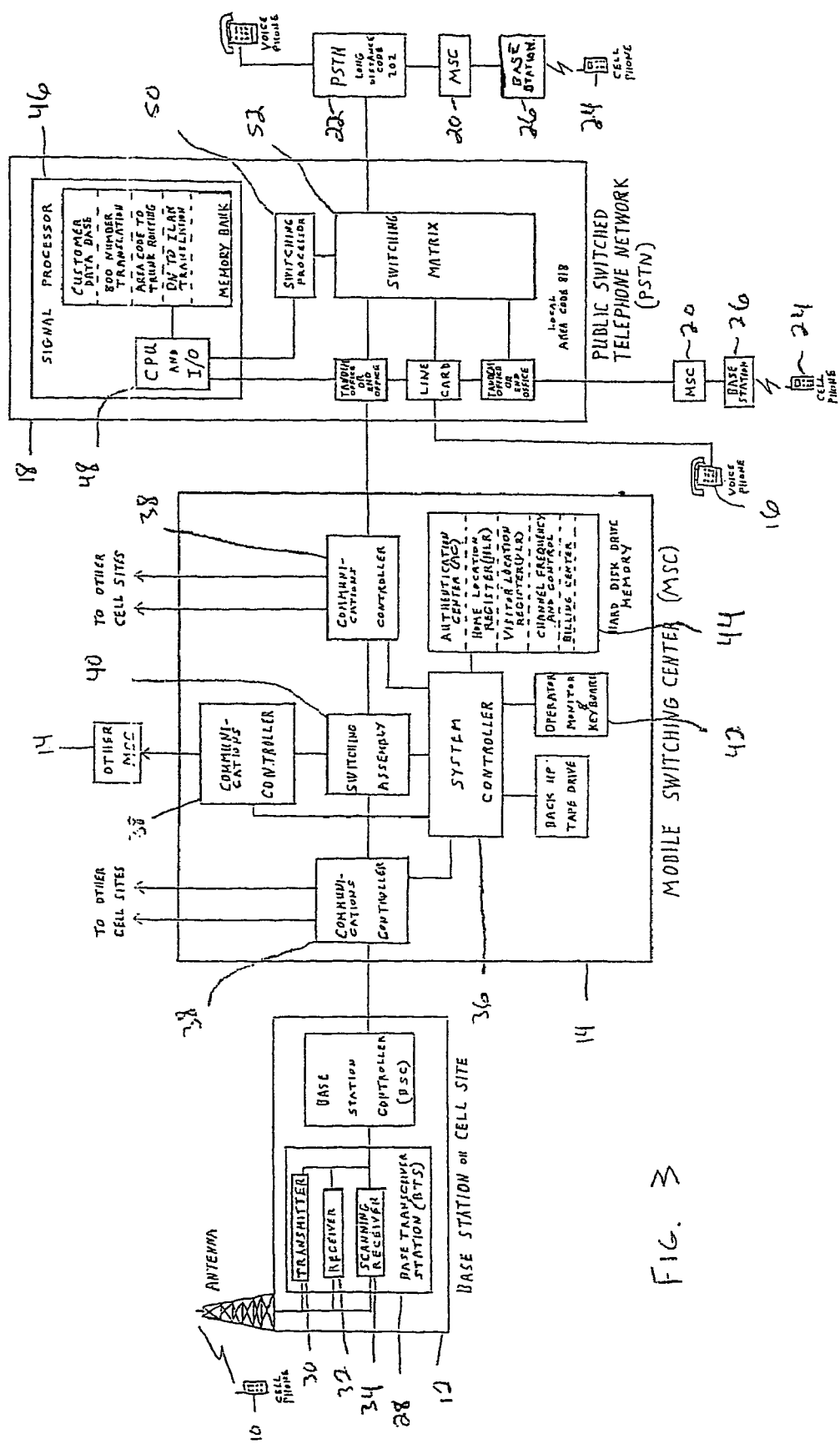
FIG. 3 is a detailed view of the schematic components of FIG. 2, showing internal components of each major part of a network implementing the present invention.

FIG. 3 is a detailed view of the components of the system of FIG. 2. The baseband voice signal (analog or digital) of the wireless phone 10 is converted into RF signals for communication between the base station 12 and the wireless phone 10. This is accomplished at the base station 12, which includes a transceiver 28 having a transmitter 30, a receiver 32, and a scanning receiver 34.

FIG. 3 is a detailed view of the components of the system of FIG. 2. The baseband voice signal (analog or digital) of the wireless phone 10 is converted into RF signals for communication between the base station 12 and the wireless phone 10. This is accomplished at the base station 12, which includes a transceiver 28 having a transmitter 30, a receiver 32, and a scanning receiver 34.

The base station 12 also includes a system controller 36 that coordinates the operation of all base station equipment based on commands received from the MSC 14. The functions of the system controller 36 include control signal routing and message processing. The system controller 36 inserts control channel signaling messages, sets up voice channels, and operates the radio location/scanning receiver. In addition, the system controller 36 monitors equipment status and reports operational and failure status to the MSC 14.

The MSC 14 coordinates all communication channels and processes. The MSC 14 processes requests for service from wireless phones and land line callers, and routes calls between the base station 12 and the PSTN 18. The MSC 14 receives the dialed digits, creates and interprets call processing tones, and routes the call paths.

The MSC's main components are the system controller 36, communication controllers 38, a switching assembly 40, operator terminals 42, and subscriber database registers 44. The system controller 36 guides the MSC 14 by coordinating the base stations, MSC switching functions, and PSTN connections. The system controller 36 creates and interprets commands between the MSC 14 and the base stations, controls the MSC switch, validates customers requesting access, maintains air time and PSTN billing records, and monitors for equipment failures. The communications controllers 40 process and buffer voice and data information between the MSC, base stations and PSTN. They combine voice paths with high-speed data and, in reverse, separate voice paths from high-speed data.

The switching assembly 40 connects base stations and the PSTN 18 with either a physical connection (analog) or a logic path (digital). Analog switches require a physical connection between switch paths. Current digital wireless switches use digital communication links. The switching assembly 40 is a high speed matrix memory storage and retrieval system that provides virtual connections between the base station voice channels and the PSTN voice channels. Operator terminals 42 control maintenance and administrative functions. An operator terminal 42 may be a computer monitor and keyboard dedicated to controlling equipment and modifying the subscriber database registers.

The system controller 36 processes various subscriber database registers 44, such as Authentication Center (AC), Home Location Register (HLR), Visitor Location Register (VLR), ard Billing Center. The Authentication Center (AC) stores and processes information required to authenticate a wireless phone. During authentication, the AC processes information from the wireless phone and compares it to previously stored information. If the processed information matches, the wireless phone passes.

The Home. Location Register (HLR) is a subscriber database register 44 containing each customer's Mobile Identification Number (MIN), which is the 10-digit phone number, and 11-digit Electronic Serial Number (ESN) of the wireless phone to uniquely identify each customer. Each wireless phone is created with a unique eleven-digit electronic serial number (ESN). The first three digits represent the manufacturer, and the last eight are a serial number. The combined MIN and ESN uniquely identify a valid subscriber. Each customer's user profile includes the selected long distance carrier, calling restrictions, service fee charge rates, and other selected network options. The subscriber can change and store the changes for some feature options in the HLR-(such as call forwarding). The system controller 36 uses this information to authorize system access and process individual call billing.

The HLR register is a set of bits of high-speed memory within a central processing unit. Instructions fetch the data to the register from a database in a magnetic hard disk memory. The subscriber database registers 44 are critical, so they are regularly backed up, typically on tape, to restore the information if the HLR system fails.

The Visitor Location Register (VLR) contains a subset of a subscriber's HLR information for use while roaming. The VLR eliminates the need for the visited MSC to continually check with the visitor's HLR each time access is attempted. The visitor's information is temporarily stored in the VLR memory, and then erased either when the wireless phone registers in another system or after a specified period of inactivity.

The base station 12 may command the wireless phone 10 to respond to commands (system orders) independent of the user's knowledge. This includes system registration commands. When the wireless phone receives an order, it will setup its response message (a flag) to indicate that it will access the system as a response to a system order.

The present system of sending line calls from a wireless phone 10 is not affected by the present invention. The originating wireless phone 10 dials the 7-digit or the 10-digit line number and the call is routed by the MSC 14 to the nearby PSTN 18 to the line phone 16 or through several PSTNs to a long distance line phone 16. The present invention also has no effect on line phone to line phone calls. All originating 7-digit and 10-digit calls from a line phone to another line phone would be routed in the present manner through the PSTNs.

When the call reaches the PSTN 18 in FIG. 3, the set of prefix characteristics and telephone number are processed by a signal processor 46 which determines the communications service to which the call is intended. The call enters a central processing unit 48 in the signal processor 46. The signal processor may include a memory unit having database registers, such as a customer database, an 800 number translation register an area code routing register, and a DN-to-ILAN translation register. This register includes tables that translate Direct Number signals to Internal Line Appearance Number signals for processing telephone calls.

After a call having a set of prefix characteristics and a telephone number is processed by the central processing unit 48 and the signal processor 46, the call is sent through the central processing unit output port to a switching processor 50 and then to the switching matrix 52 after the call's destination is determined. The switching matrix 52 then routes the call to the particular component of the PSTN 18 that will transmit the call to the intended destination. For example, if the set of prefix characteristics plus the telephone number indicates that the call is intended for a local line telephone, the switching matrix 52 routes the call through a line connection to the intended device. If the set of prefix characteristics plus the telephone number indicates that the call is intended for a local wireless phone, the switching matrix 52 routes the call to an MSC in the local area, which in turn identifies the intended destination and routes the call appropriately. If the set of prefix characteristics plus the telephone number indicates that another specific communications device is intended, such as a pager, the switching matrix 52 also routes the call accordingly. Furthermore, if the set of prefix characteristics plus the telephone number indicates that the call is intended for a specific communications device, wireless or otherwise, in another geographic location, the switching matrix 52 routes the call to another PSTN 22, where a signal processor having a central processing unit identifies the communications device intended using the set of prefix characteristics plus the telephone number and instructs the switching matrix 52 to route the call accordingly. (Note: The above discussion is written from the user's viewpoint. In preferred embodiments of the invention, the set of prefix characteristics is actually part of the assignable telephone number. The term "plus the telephone number" refers only to that portion of the assignable telephone number containing seven numerical digits.)

It is to be understood that other embodiments may be utilized and structural and functional changes may be made without departing from the scope of the present invention. The foregoing description of the embodiments of the invention have been presented for the purposes of illustration and description. It is not intended to be exhaustive or to limit the invention to the precise form disclosed. Accordingly, many modifications and variations are possible in light of the above teaching. For example, the set of prefix characteristics may be a set of suffix characteristics dialed at the conclusion of a telephone number. In another example, the set of prefix characteristics dialed to indicate a particular communications device may include symbols not currently included on telephones but which are possible in light of the frequencies associated with the telephone keypads. It is therefore intended that the scope of the invention be limited not by this detailed description, but rather by the claims appended hereto.

I claim:

1. A method of processing a call, the method comprising:
informing a customer of a telecommunications system that is capable of routing calls to a plurality of communications devices of the customer that one of a plurality of unique sets of symbol headings is normally, but not always, associated with one type of communications device that is connectable to the telecommunications system;
assigning one of a plurality of common 7-digit telephone numbers available within an area code of a local area to the customer of the telecommunications system and granting the customer having a specific communications device that is connected to the telecommunications system the exclusive right to optionally use a combination comprising any one of said unique sets of symbol headings plus said common 7-digit telephone number to identify the specific communications device other than a voice landline device to the other customers of the telecommunications system, the specific communications device being identified as one of the plurality of communications devices of the customer;
receiving a sequence of signals representing a specific set of symbol headings plus a specific common 7-digit telephone number that has been dialed by a caller, the combination of the specific set of symbol headings plus said specific common 7-digit telephone number and no other common 7-digit telephone number alone identifying the specific communications device that is the destination for said call; and
connecting said call to the specific communications device that is the destination for said call without the need for the telecommunications system to determine the type of communications device to which the call is directed;
wherein only one specific communications device of the customer has its own 7-digit telephone number; and
wherein no other communications device shares a line with said voice landline device.

2. The method of claim 1, wherein the specific set of symbol headings is a # symbol and the # symbol plus said specific common 7-digit telephone number identifies a specific fax machine or a specific second voice line with or without an associated facsimile machine.

3. The method of claim 1, wherein the specific set of symbol headings is a * symbol and the * symbol plus said specific common 7-digit telephone number identifies a first specific cellular telephone.

4. The method of claim 3, wherein the specific set of symbol headings is a digit plus the * symbol and the * symbol plus said specific common 7-digit telephone number identifies another specific cellular telephone.

5. A method of directing a call to a specific communications device, comprising:
announcing to a customer of a telecommunications system that is capable of routing calls to a plurality of communications devices of the customer that one of a plurality of unique symbols is normally associated with a particular type of communications device that is connectable to a telecommunications system;
assigning one of a plurality of common 7-digit telephone numbers to the customer of the telecommunications system and granting the customer having a specific communications device the exclusive right to optionally use a combination comprising any one of said unique symbols plus said common 7-digit telephone number to identify the specific communications device to other customers of the telecommunications system, the specific communications device being identified as one of the plurality of communications devices of the customer; and
receiving a call having been initiated by a caller by dialing a combination comprising a specific unique symbol and a specific common 7-digit telephone number;
determining the destination indicated by the combination, no other common 7-digit telephone number alone indicating said destination; and
routing the call to the specific communications device represented by the combination, without the need for the telecommunications system to determine the type of communications device to which the call is directed;
wherein only one specific communications device of each selected customer has its own 7-digit telephone number; and wherein no other communications device shares a line with said specific communications device.

6. The method of claim 5, wherein the specific unique symbol is a pound key and the pound key plus said specific common 7-digit telephone number identifies a specific facsimile machine or a specific second voice line with or without an associated facsimile machine.

7. The method of claim 5, wherein the specific unique symbol is a star key and star key plus said specific common 7-digit telephone number identifies a first specific cellular telephone.

8. The method of claim 5, wherein the specific unique symbol is a digit plus the star key and star key plus said specific common 7-digit telephone number identifies another specific cellular telephone.

9. The method of claim 5, further comprising directing the call to a cellular processing network if the specific unique symbol and the specific common 7-digit telephone number indicates that the call is being made to a specific cellular telephone.

10. A system for processing a call made to a telephone number and directed to a specific communications device to which that telephone number is assigned, the system comprising:
    means for announcing to a customer of a telecommunications system that is capable of routing calls to a plurality of communications devices of the customer that one of a plurality of suggested sets of symbol headings is normally associated with a single type of communications device that is connectable to a telecommunications system;
    means for assigning one of a plurality of common telephone numbers to the customer of the telecommunications system and granting the customer having a specific communications device the exclusive right to optionally use a combination comprising any one of said suggested sets of symbol headings plus said common telephone number to identify the specific communications device to other customers of the telecommunications system, the specific communications device being identified as one of the plurality of communications devices of the customer;
    a sequence of signals representing a specific set of symbol headings and a specific common telephone number that have been dialed by a caller, the sequence of signals being the sole directory number for the specific communications device, the set of symbol headings immediately preceding the telephone number, being distinguishable from said common telephone number and together with said common telephone number defining a destination for said call; and
    a routing apparatus having a switching component and an identification component for determining the intended destination of the call and connecting the call to that destination without the need for the telecommunications system to determine the type of communications device to which the call is directed;
    wherein only one specific communications device of each selected customer has its own 7-digit telephone number; and
    wherein no other communications device shares a line with said specific communications device.

11. A routing system for directing calls to different communications devices having identical common 7-digit voice landline telephone numbers, said system comprising:
    an administrative subsystem comprising means for informing a customer of a telecommunications system that is capable of routing calls to a plurality of communications devices of the customer that one of a plurality of symbol headings is normally associated with each type of communications device that is connectable to a telecommunications system and means for assigning one of a plurality of common telephone numbers to the customer of the telecommunications system and granting said the customer having a specific communications device the exclusive right to optionally use a combination comprising any one of said plurality of symbol headings plus said common telephone number to identify the specific communications device to other customers of the telecommunications system, the specific communications device being identified as one of the plurality of communications devices of the customer;
    a network subsystem having routing apparatus including a switching component and an identification component for processing a call to a destination, the call including a sequence of signals indicating a particular one of said plurality of symbol headings and a particular common telephone number that have been dialed by a caller, the sequence of signals being the sole directory number for the specific communications device; and
    at least one communications device assigned to a common telephone number;
    wherein said particular one of said plurality of symbol headings does not indicate to said routing apparatus that the specific communications device is a particular type of communications device;
    wherein only one specific communications device of each selected customer has its own 7-digit telephone number; and
    wherein no other communications device shares a line with said specific communications device.

12. In a telecommunications system that is capable of routing calls to a plurality of communications devices of a subscriber and in which the subscriber controls more than one of said plurality of communications devices, a system for routing a telephone call to a specific communications device of the subscriber, said system comprising:
    means for accepting a combination comprising a heading and a common telephone number as an indication that a caller desires to reach the specific communications device of the subscriber, said specific communications device of the subscriber being reachable by the caller's dialing no other common 7-digit telephone number, said specific communications device being indicated as one of the plurality of communications devices of the subscriber; and
    means for routing said telephone call to the specific communications device of the subscriber;
    wherein said heading does not indicate to said means for routing that the telephone call is a particular type of communication;
    wherein only one specific communications device of the subscriber has its own 7-digit telephone number; and
    wherein no other communications device shares a line with the specific communications device.

13. The system of claim 12 wherein the specific communications device of the particular subscriber is selected from the group consisting of:
    another voice landline telephone,
    a cellular or wireless telephone,
    a facsimile machine, and
    a pager.

14. The system of claim 12 wherein said heading is selected from the group consisting of:
a first symbol that precedes an area code,
a second symbol that follows an area code,
a third symbol that precedes an area code, and
a fourth symbol that follows an area code.

15. The system of claim 12, wherein said heading is a # symbol and the # symbol plus said common telephone number identifies a specific facsimile machine or a specific second voice line with or without an associated facsimile machine.

16. The system of claim 12, wherein said heading is a * symbol and * symbol plus said telephone common number identifies a first specific cellular telephone.

17. The system of claim 12, wherein said heading is a digit plus a * symbol and the digit plus the * symbol plus said common telephone number identifies another specific cellular telephone.

18. The system of claim 12, wherein said heading is a digit plus a # symbol and the digit plus the # symbol plus said common telephone number identifies another specific voice landline device with or without an associated facsimile machine.

19. In a telecommunications system that is capable of routing calls to a plurality of communications devices of a subscriber, a system for routing a telephone call to a specific communications device of the subscriber, said system comprising:
means for assigning a common telephone number to the subscriber;
means for accepting the common telephone number alone as an indication that a caller desires to reach the specific communications device of the subscriber, said specific communications device of the subscriber being a first voice landline telephone, the specific communications device being indicated as one of the plurality of communications devices of the subscriber;
means for accepting a combination comprising a symbol and the common telephone number as an indication that the caller desires to reach another specific communications device of the subscriber, said other specific communications device of the subscriber being reachable by the caller's dialing no other common 7-digit telephone number, the other specific communications device being indicated as another one of the plurality of communications devices of the subscriber; and
means for routing said telephone call to the specific communications device of the subscriber;
wherein said symbol does not indicate to said means for routing that said telephone call is a particular type of communication;
wherein each other specific communications device does not have its own 7-digit telephone number; and
wherein no other communications device shares a line with said first landline telephone.

20. The system of claim 19 wherein at least one communications device must be in service for the subscriber, said at least one communications device being selected from the group consisting of said first voice landline telephone, a facsimile machine and a cellular telephone.

21. The system of claim 19 wherein the other specific communications device of the subscriber is selected from the group consisting of:
another voice landline telephone,
a facsimile machine, and
a cellular or wireless telephone.

22. The system of claim 19, wherein said symbol is a # symbol and the # symbol plus said common telephone number identifies a specific fax machine or a specific second landline telephone.

23. The system of claim 19, wherein said symbol is a * symbol and the * symbol plus said common telephone number identifies a first specific cellular telephone.

24. The system of claim 19, wherein said symbol is a digit plus a # symbol and the digit plus the # symbol plus said common telephone number identifies another specific voice landline telephone or another facsimile machine.

25. The system of claim 19, wherein said symbol is a digit plus a * symbol and the digit plus the * symbol plus said common telephone number identifies another specific cellular telephone.

26. In a telecommunications system that is capable of routing telephone calls to a plurality of communications devices of a particular subscriber within an area code, a routing system for routing a telephone call to a specific communications device of the particular subscriber, said routing system comprising:
means for assigning a common 7-digit telephone number to the particular subscriber;
means for accepting the common 7-digit telephone number alone as an indication that a caller desires to reach the specific communications device of the particular subscriber, said specific communications device of the particular subscriber being a first voice landline device, the specific communications device being indicated as one of the plurality of communications devices of the particular subscriber;
means for accepting an 8-part or 9-part telephone number comprising a heading and the common 7-digit telephone number as an indication that the caller desires to reach another specific communications device of the particular subscriber, said other specific communications device of the particular subscriber being reachable by the caller's dialing no other common 7-digit telephone number, the other specific communications device being indicated as another one of the plurality of communications devices of the particular subscriber; and
means for routing said telephone call to the specific communications device of the particular subscriber;
wherein said heading does not indicate to said means for routing that the call is a particular type of communication;
wherein said caller has the option of using as the heading a # for a facsimile device or a second voice device, a * for a first cellular device, or a 2*, a 3*, a 4*, a 5*, a 6*, a 7*, a 8*, or a 9* for another cellular device;
wherein each other specific communications device does not have its own 7-digit telephone number; and
wherein no other communications device shares a line with said first voice landline device.

27. In a telecommunications system that is capable of routing telephone calls to a plurality of communications devices of a subscriber that is one of a plurality of subscribers within an area code, a method for routing a telephone call to a specific communications device of the subscriber, said method for routing comprising:
assigning a common 7-digit telephone number to the subscriber;
accepting the common 7-digit telephone number alone as an indication that a caller desires to reach the specific communications device of the subscriber, said specific communications device being a first voice landline device, the specific communications device being indicated as one of the plurality of communications devices of the subscriber;

accepting an 8-part or 9-part telephone number comprising a heading and the common 7-digit telephone number as an indication that the caller desires to reach another specific communications device of the subscriber, said other specific communications device being reachable by the caller's dialing no other common 7-digit telephone number, the other specific communications device being indicated as another one of the plurality of communications devices of the subscriber; and routing said telephone call to the specific communications device of the subscriber;

wherein said heading does not indicate to said system that the call is a particular type of communication;

wherein said caller has the option of using as the heading a # for a facsimile device or a second landline voice device, a * for a first cellular device, or a 2*, a 3*, a 4*, a 5*, a 6*, a 7*, a 8*, or a 9* for another cellular device; and wherein each other specific communications device does not have its own 7-digit telephone number; and wherein no other communications device shares a line with said first voice landline device.

28. The method of claim 27, further comprising:

increasing the total number of telephone numbers that are available to said caller in the area code from 7.92 million to 87.12 million without changing the common 7-digit telephone number that is assigned to any of the plurality of subscribers, thereby avoiding the inconvenience, stress and cost to any of the plurality of subscribers of changing that 7-digit telephone number.

29. The method of claim 27, further comprising:

increasing the total number of telephone numbers that are available to said caller within the area code by a factor of 11 without changing the specific common 7-digit telephone number that is assigned to any of the plurality of subscribers, thereby eliminating the present overlay practice of having two area codes in the same geographic region, which practice requires mandatory local 10-digit dialing of telephone numbers that must include one of the two area codes even if the one area code is the area code of said caller.

30. The method of claim 27, further comprising:

routing said telephone call without requiring the caller to dial a 10-digit telephone number within any geographic region having a requirement for no more than 87.12 million telephone numbers, said 10-digit number comprising a new overlay area code and the common 7-digit telephone number.

31. The method of claim 27, further comprising accepting a 10-part or telephone number comprising the heading and the common 7-digit telephone number as an indication that the caller desires to reach a cellular communications device of the subscriber, said heading comprising a two-digit number in the range 20 through 99 plus a *.

32. The method of claim 27, further comprising:

increasing the total number of cellular telephone numbers that are available to said caller in the area code to 71.28 million, thereby matching consumer demand for cellular telephone numbers, which is growing at a faster rate than the demand for landline telephone numbers.

33. The method of claim 27, further comprising:

encouraging the plurality of subscribers not to use any common 7-digit telephone number as a destination of a facsimile communication or a cellular communication, thereby increasing the number of 7-digit telephone numbers that are available to said caller as the destination for a voice landline communication within the area code by a factor of up to 3 by eliminating the need for any 7-digit telephone number to be used as facsimile machine number or cellular telephone number and allowing the available 7.92 million telephone numbers within each area code to be used as landline telephone numbers.

34. The method of claim 27, further comprising:

providing a first complement of telephone numbers that are recommended for use to identify voice landline telephones, a second complement of telephone numbers that are recommended for use to identify facsimile machines and a third complement of telephone numbers that are recommended for use to identify cellular telephones, without affecting the way the telephone call is processed in existing public switched telephone networks; and eliminating the practice of splitting a region previously served by an existing single area code into two halves whenever the existing area code reaches its maximum capacity of 7.92 million subscribers, and adding a new area code in one of the halves of the region, forcing one half or 3.96 million subscribers to accept a new 10-digit telephone number containing said new area code, at a great level of inconvenience, stress and cost of changing telephone numbers with the addition of each new area code.

35. In a telecommunications system having 199.1 million residential subscribers and that is capable of routing telephone calls to a plurality of communications devices of a residential subscriber, a method for routing a telephone call to a specific communications device of said residential subscribers subscriber, said method for routing comprising:

assigning a common 7-digit telephone number to the residential subscriber;

accepting the common 7-digit telephone number alone as an indication that a caller desires to reach a first voice landline communications device of the residential subscriber or accepting an 8-part or 9-part telephone number comprising a heading and the common 7-digit telephone number as an indication that the caller desires to reach a cellular telephone communications device of the residential subscriber, said cellular telephone communications device being reachable by the caller's dialing no other common 7-digit telephone number, the first landline communications device or the cellular telephone being indicated as one of the plurality of communications devices of the residential subscriber; and routing said telephone call to the appropriate communications device of the residential subscriber without the need for the telecommunications system to determine the type of communications device to which the telephone call is directed;

wherein said cellular telephone communications device does not have its own 7-digit telephone number; and wherein no other communications device shares a line with said first voice landline communications device;

thereby releasing the other 7-digit telephone numbers that are currently in use as cellular telephone numbers for other uses.

36. In a telecommunications system that is capable of routing telephone calls to a plurality of communications devices of a particular subscriber, a system for routing a telephone call to a specific communications device of the particular subscriber, said system comprising:

means for assigning a common 7-digit telephone number to the particular subscriber;

means for accepting the common telephone number alone as an indication that a caller desires to reach the specific communications device of the particular subscriber, said specific communications device of the particular subscriber being a first voice landline telephone, the specific communications device being indicated as one of the plurality of communications devices of the particular subscriber; and means for accepting a combination comprising a symbol and the common telephone number as an indication that the caller desires to reach another specific communications device of the particular subscriber, said specific communications device of the particular subscriber being reachable by the caller's dialing no other common 7-digit telephone number, the other specific communications device being indicated as another one of the plurality of communications devices of the particular subscriber; and means for routing the telephone call to the specific communications device of the particular subscriber without the need for the telecommunications system to determine the type of communications device to which the telephone call is directed; and wherein at least one communications device must be in service for each particular subscriber, said at least one communications device being selected from the group consisting of said first voice landline telephone, a facsimile machine and a cellular telephone;

wherein each other specific communications device does not have its own 7-digit telephone number; and wherein no other communications device shares a line with said first voice landline telephone;

whereby the particular subscriber's facsimile machine combination and the particular subscriber's cellular combination both include the particular subscriber's common 7-digit telephone number; and whereby the particular subscriber and no other subscriber can use said particular subscriber's common 7-digit telephone number, said particular subscriber's facsimile machine combination or said particular subscriber's cellular telephone combination as the particular subscriber's sole telephone number as long as any one of them is in service.

37. In a telecommunications system that is capable of routing telephone calls to a plurality of communications devices of a particular subscriber, a system for routing a telephone call from a caller to a specific communications device of the particular subscriber, said system comprising:

means for assigning a first telephone number to the landline telephone of the particular subscriber, a second telephone number to a facsimile machine or second landline telephone of the particular subscriber and a third telephone number to a cellular telephone of the particular subscriber, each of the landline telephone, the facsimile or second landline telephone and the cellular telephone being one of the plurality of communications devices of the particular subscriber; and means for routing the telephone call to the specific communications device of the particular subscriber without the need for the telecommunications system to determine the type of communications device to which the telephone call is directed;

wherein only one specific communications device of the particular subscriber has its own 7-digit telephone number;

wherein all of said telephone numbers comprise the exact same seven numerical digits and no other numerical digits, said second telephone number further comprises a # heading digit, and said third telephone number comprise a * heading digit;

wherein each specific communications device of the particular subscriber is reachable by the caller's dialing no other seven-digit telephone number; and wherein no other communications device shares a line with said first landline telephone.

\* \* \* \* \*